US009514306B2

(12) United States Patent
Lee et al.

(10) Patent No.: US 9,514,306 B2
(45) Date of Patent: Dec. 6, 2016

(54) RESTRICTING OPERATION RESULTS FROM BEING TRANSFERRED TO COUPLED EXTERNAL DEVICE

(71) Applicant: KT CORPORATION, Gyeonggi-do (KR)

(72) Inventors: Jung-Wook Lee, Gyeonggi-do (KR); Shin-Hyuk Kang, Seoul (KR); You-Jin Kang, Seoul (KR); Sang-Ho Koh, Gyeonggi-do (KR); Jung-Suk Park, Seoul (KR); Ji-Yong Ahn, Seoul (KR); Jae-Uk Cha, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 36 days.

(21) Appl. No.: 13/726,830

(22) Filed: Dec. 26, 2012

(65) Prior Publication Data
US 2013/0167246 A1 Jun. 27, 2013

(30) Foreign Application Priority Data
Dec. 26, 2011 (KR) .................. 10-2011-0142025

(51) Int. Cl.
*G06F 21/60* (2013.01)
*G06F 21/62* (2013.01)

(52) U.S. Cl.
CPC ........... *G06F 21/60* (2013.01); *G06F 21/6245* (2013.01); *G06F 2221/032* (2013.01)

(58) Field of Classification Search
CPC ............. G06F 21/60; G06F 2221/032; G06F 21/6245
See application file for complete search history.

(56) References Cited

U.S. PATENT DOCUMENTS

| 5,832,471 A | 11/1998 | Fukui |
| 5,875,312 A | 2/1999 | Walsh et al. |
| 6,286,066 B1 | 9/2001 | Hayes et al. |
| 6,401,157 B1 | 6/2002 | Nguyen et al. |

(Continued)

FOREIGN PATENT DOCUMENTS

| JP | 2000-163361 A | 6/2000 |
| JP | 2003-316563 A | 11/2003 |

(Continued)

OTHER PUBLICATIONS

Daniel Lawson NPL Oct. 2011—How to turn off notification; src: http://apple.stackexchange.com/questions/28883/how-can-i-turn-off-push-notifications-for-individual-apps-in-ios-5; obtained date: Aug. 26, 2014.*

(Continued)

*Primary Examiner* — Tri Tran
(74) *Attorney, Agent, or Firm* — IP Legal Services, LLC (57) ABSTRACT

Described embodiments provide a method and user equipment for restricting transferring of image data produced by a predetermined application to a coupled external device. The method may include detecting an activation of an application in a user equipment while the user equipment is coupled to an external device and determining whether image data produced by the activated application is transferred to the coupled external device. The determining may include restricting the produced image data of the activated application from being transferred to the coupled external device when an application control type of the activated application is a restricted application, otherwise, transferring the produced image data of the activated application to the coupled external device.

12 Claims, 7 Drawing Sheets

(56) References Cited

U.S. PATENT DOCUMENTS

| | | |
|---|---|---|
| 6,516,367 B1 | 2/2003 | Barenys et al. |
| 6,535,947 B1 | 3/2003 | Amoni et al. |
| 6,600,840 B1 | 7/2003 | McCrossin et al. |
| 6,697,892 B1 | 2/2004 | Laity et al. |
| 6,804,740 B1 | 10/2004 | Watts, Jr. |
| 6,862,724 B1 | 3/2005 | Riley et al. |
| 6,915,368 B2 | 7/2005 | Lin |
| 6,934,788 B2 | 8/2005 | Laity et al. |
| 7,076,536 B2 | 7/2006 | Chiloyan et al. |
| 7,117,388 B2 | 10/2006 | Arimilli et al. |
| 7,165,109 B2 | 1/2007 | Chiloyan et al. |
| 7,196,676 B2 | 3/2007 | Nakamura et al. |
| 7,199,787 B2 | 4/2007 | Lee et al. |
| 7,228,366 B2 | 6/2007 | Abramson et al. |
| 7,266,779 B2 * | 9/2007 | Baek et al. .............. 715/778 |
| 7,312,764 B2 | 12/2007 | Driver et al. |
| 7,386,868 B2 | 6/2008 | McCormack |
| 7,533,408 B1 | 5/2009 | Arnouse |
| 7,685,322 B2 | 3/2010 | Bhesania et al. |
| 7,853,944 B2 | 12/2010 | Choe |
| 7,884,836 B2 | 2/2011 | Hussain |
| 8,214,545 B2 | 7/2012 | Khan et al. |
| 8,250,277 B2 | 8/2012 | Tseng et al. |
| 8,281,366 B1 | 10/2012 | McCorkendale et al. |
| 2002/0083228 A1 | 6/2002 | Chiloyan et al. |
| 2002/0121548 A1 | 9/2002 | Lu |
| 2003/0231143 A1 | 12/2003 | Nakamura et al. |
| 2004/0006690 A1 | 1/2004 | Du et al. |
| 2004/0160193 A1 | 8/2004 | Cha et al. |
| 2004/0210321 A1 | 10/2004 | Hayashi et al. |
| 2004/0218036 A1 | 11/2004 | Boss et al. |
| 2004/0257385 A1 | 12/2004 | Kim et al. |
| 2004/0266425 A1 | 12/2004 | Gonsalves et al. |
| 2005/0068252 A1 | 3/2005 | Driver et al. |
| 2005/0257052 A1 | 11/2005 | Asai et al. |
| 2006/0036788 A1 | 2/2006 | Galang et al. |
| 2006/0132473 A1 | 6/2006 | Fuller et al. |
| 2006/0190652 A1 | 8/2006 | Keely et al. |
| 2007/0077965 A1 | 4/2007 | Fox |
| 2007/0171239 A1 | 7/2007 | Hunt et al. |
| 2007/0239844 A1 * | 10/2007 | Yokoyama et al. .......... 709/217 |
| 2007/0245398 A1 | 10/2007 | Roden |
| 2007/0257927 A1 | 11/2007 | Sakanishi et al. |
| 2008/0144051 A1 | 6/2008 | Voltz et al. |
| 2008/0152305 A1 | 6/2008 | Ziegler |
| 2008/0225013 A1 | 9/2008 | Muylkens et al. |
| 2008/0303746 A1 | 12/2008 | Schlottmann et al. |
| 2009/0049554 A1 | 2/2009 | Vuong et al. |
| 2009/0109822 A1 | 4/2009 | Hung |
| 2009/0163139 A1 | 6/2009 | Wright-Riley |
| 2009/0178097 A1 | 7/2009 | Kim et al. |
| 2009/0231485 A1 | 9/2009 | Steinke |
| 2010/0064228 A1 | 3/2010 | Tsern |
| 2010/0064248 A1 | 3/2010 | Lee et al. |
| 2010/0066698 A1 | 3/2010 | Seo |
| 2010/0153501 A1 * | 6/2010 | Gabriel et al. ............... 709/206 |
| 2010/0251243 A1 | 9/2010 | Gill et al. |
| 2010/0265652 A1 | 10/2010 | Agata et al. |
| 2010/0318709 A1 | 12/2010 | Bell et al. |
| 2011/0034242 A1 | 2/2011 | Aronzon et al. |
| 2011/0037711 A1 | 2/2011 | Siddiqui et al. |
| 2011/0083140 A1 | 4/2011 | Kim et al. |
| 2011/0098087 A1 | 4/2011 | Tseng |
| 2011/0102554 A1 | 5/2011 | Saito et al. |
| 2011/0134047 A1 | 6/2011 | Wigdor et al. |
| 2011/0138327 A1 | 6/2011 | Scott et al. |
| 2011/0202872 A1 | 8/2011 | Park |
| 2011/0275391 A1 | 11/2011 | Lee et al. |
| 2011/0285916 A1 | 11/2011 | Takiduka |
| 2011/0296308 A1 * | 12/2011 | Yi ................... 715/733 |
| 2011/0306389 A1 | 12/2011 | Nagayama |
| 2012/0011451 A1 | 1/2012 | Bansal et al. |
| 2012/0050183 A1 | 3/2012 | Lee |
| 2012/0050331 A1 | 3/2012 | Kanda |
| 2012/0062479 A1 | 3/2012 | Feldstein et al. |
| 2012/0088548 A1 | 4/2012 | Yun et al. |
| 2012/0117167 A1 * | 5/2012 | Sadja et al. .................. 709/206 |
| 2012/0155325 A1 | 6/2012 | Eichen et al. |
| 2012/0155454 A1 | 6/2012 | Eichen et al. |
| 2012/0172088 A1 | 7/2012 | Kirch et al. |
| 2012/0280907 A1 | 11/2012 | Masaki et al. |
| 2012/0297207 A1 | 11/2012 | Carlsen et al. |
| 2012/0324041 A1 * | 12/2012 | Gerber ............... H04L 67/26 709/217 |
| 2013/0033414 A1 | 2/2013 | Zheng et al. |
| 2013/0089202 A1 | 4/2013 | Altmann |
| 2013/0104149 A1 | 4/2013 | Ahn et al. |
| 2014/0208276 A1 | 7/2014 | Park |

FOREIGN PATENT DOCUMENTS

| | | |
|---|---|---|
| JP | 2005-284657 A | 10/2005 |
| JP | 2006-094367 A | 4/2006 |
| JP | 2008-158342 A | 7/2008 |
| JP | 2011-142392 A | 7/2011 |
| JP | 2011-259253 A | 12/2011 |
| KR | 20-0290286 Y1 | 9/2002 |
| KR | 10-2004-0074759 A | 8/2004 |
| KR | 10-2005-0015125 A | 2/2005 |
| KR | 10-0487618 B1 | 5/2005 |
| KR | 10-2005-0096578 A | 10/2005 |
| KR | 10-2006-0018083 A | 2/2006 |
| KR | 10-2008-0027813 A | 3/2008 |
| KR | 10-2009-0092337 A | 8/2009 |
| KR | 10-2010-0032660 A | 3/2010 |
| KR | 10-2010-0039592 A | 4/2010 |
| KR | 10-2010-0108885 A | 10/2010 |
| KR | 20-2010-0009920 U | 10/2010 |
| KR | 10-2010-0128630 A | 12/2010 |
| KR | 10-2010-0133243 A | 12/2010 |
| KR | 10-2011-0030963 A | 3/2011 |
| KR | 10-1017866 B1 | 3/2011 |
| KR | 10-2011-0057930 A | 6/2011 |
| KR | 10-2011-0093541 A | 8/2011 |
| KR | 10-2011-0111857 A | 10/2011 |
| KR | 10-2011-0115489 A | 10/2011 |
| KR | 10-2011-0123348 A | 11/2011 |
| KR | 10-2011-0131439 A | 12/2011 |
| KR | 10-2011-0134495 A | 12/2011 |

OTHER PUBLICATIONS

MS Office 2007: Turn alrt on or off; src: https://support.office.com/en-ie/article/Turn-Desktop-Alerts-on-or-off-a83fe224-3109-4de0-a1ab-c33fd103a422; obtained date: Jan. 5, 2015.*

* cited by examiner

RESTRICTING OPERATION RESULTS FROM BEING TRANSFERRED TO COUPLED EXTERNAL DEVICE

CROSS REFERENCE TO PRIOR APPLICATIONS

The present application claims priority under 35 U.S.C. §119 to Korean Patent Application No. 10-2011-0142025 (filed on Dec. 26, 2011), which is hereby incorporated by reference in its entirety.

The subject matter of this application is related to U.S. patent application Ser. No. 13/540,112 filed Jul. 2, 2012, U.S. patent application Ser. No. 13/539,929 filed Jul. 2, 2012, U.S. patent application Ser. No. 13/460,091 filed Apr. 30, 2012, U.S. patent application Ser. No. 13/598,741 filed Aug. 30, 2012, U.S. patent application Ser. No. 13/904,286 filed May 29, 2013, U.S. patent application Ser. No. 13/726,361 filed Dec. 24, 2012, U.S. patent application Ser. No. 13/726,811 filed Dec. 26, 2012, U.S. patent application Ser. No. 13/726,384 filed Dec. 24, 2012, U.S. patent application Ser. No. 13/726,404 filed Dec. 24, 2012, and U.S. patent application Ser. No. 13/726,422 filed Dec. 24, 2012, the teachings of which are incorporated herein their entirety by reference.

FIELD OF THE INVENTION

The present invention relates to user equipment and, in particular, to restricting image data produced by a predetermined application from being transferred to a coupled external device.

BACKGROUND OF THE INVENTION

User equipment has advanced so as to perform multiple functions such as communicating voice and data with others; exchanging text messages or multimedia messages; sending e-mails; capturing a still or moving image; playing back a music or a video file, playing a game, and a receiving a broadcast signal. Lately, such multi-functional user equipment has received greater attention for new applications. Instead of using multiple independent devices, a user prefers to use single multifunction-enabled user equipment. Portability and/or mobility should be considered in design of user equipment, but such user equipment has limitations in size. Accordingly, there also are limitations in display screen size, screen resolution, and speaker performance.

In order to overcome such limitations, an external device having a large display size, better speaker performance, and connectable to a mobile terminal has been introduced. Such external device connected to the mobile terminal can provide data, music files, and other content stored in the mobile terminal in better performance.

For example, user equipment may be coupled to an external device having a large sized screen such as a TV or a projector and display image data through the external device. In this case, the external device displays mirrored image data that is exactly same as image data displayed on user equipment. Due to such a typical way of transferring image data from the user equipment to the coupled external device, a user might not desire to show all image data produced in the user equipment on the external device. For example, while displaying a presentation material on a larger screen TV coupled to the user equipment, a notification message may be generated in response to an event signal that invokes an application associated with a push service, such as a messenger application or an e-mail application. When such notification message has very private content, a corresponding user might be very embarrassed and audiences thereof might be greatly distracted.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, user equipment may not transfer image data produced by a predetermined application to a coupled external device while the user equipment is coupled to the external device.

In accordance with at least one embodiment of the present invention, a method may be provided for restricting transferring of image data produced by a predetermined application to a coupled external device. The method may include detecting an activation of an application in a user equipment while the user equipment is coupled to an external device and determining whether image data produced by the activated application is transferred to the coupled external device.

The determining may include restricting the produced image data of the activated application from being transferred to the coupled external device when an application control type of the activated application is a restricted application, otherwise, transferring the produced image data of the activated application to the coupled external device.

The method may further include providing a user interface for selecting at least one of applications installed in the user equipment to a user, receiving selection inputs from the user through the provided user interface, selecting applications based on the received selection inputs from the user, setting the operation control type of the selected applications as a restricted application, otherwise, setting the operation control type of unselected applications as an allowed application.

The application control type of the activated application may be a restricted application when the activated application is an application automatically generating a message in response to a predetermined event signal.

The application control type of the activated application may be a restricted application when the activated application is associated with a push service.

The determining may include restricting the produced image data of the activated application from being transferred to the coupled external device when a device type of the coupled external device is a restricted external device, otherwise, transferring the produced image data of the activated application to the coupled external device.

The method may further include providing a user interface a user for registering a coupled external device as a restricted external device and an allowed external device, receiving selection inputs from the user, and setting a device type of the coupled external device as one of the restricted external device and the allowed external device based on the selection inputs from the user.

The determining may include restricting the produced image data of the activated application from being transferred to the coupled external device when an application control type of the activated application is a restricted application and when a device type of the coupled external device is a restricted external device, otherwise, transferring the produced image data of the activated application to the coupled external device.

The determining may include restricting the produced image data of the activated application from being transferred to the coupled external device when the activated application supports inactivated at least one service feature of the user equipment, otherwise, transferring the produced image data of the activated application to the coupled external device. The at least one service feature may be a notification service feature of the user equipment.

In accordance with at least one embodiment of the present invention, user equipment may be provided for restricting transferring of image data produced by a predetermined application to a coupled external device. The user equipment may include an application manager, a mode setup unit, and a controller. The application manager may be configured to detect an activation of an application. The mode setup unit may be configured to detect an operation mode of the user equipment. The controller may be configured to determine whether image data produced by the activated application is transferred to a coupled external device when the mode setup unit detects the operation mode of the user equipment as a connected mode. The controller may be configured to restrict the produced image data of the activated application from being transferred to the coupled external device when an application control type of the activated application is a restricted application, otherwise, to transfer the produced image data of the activated application to the coupled external device.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, user equipment may restrict image data produced by predetermined applications from being transferred to a coupled external device while the user equipment is coupled to an external device. Particularly, user equipment may not transfer a notification message produced by an application associated with a push service to a coupled external device while the user equipment is coupled to the external device. In this case, such notification message may be displayed on user equipment but not on a coupled external device. Particularly, user equipment may restrict at least one feature of predetermined applications from being performed while the user equipment is coupled to an external device. User equipment may restrict a certain operation result of predetermined application from being transferred to a coupled external device while the user equipment is coupled to the external device. The predetermined application may be an application associated with a push service. The application associated with a push service may automatically generate a notification message in response to a predetermined event signal. Such applications may include various types of applications such as an e-mail application, a short message service (SMS) application, a messenger application, and so forth. The application associated with a push service may be regularly updated by a related serve. Such application also automatically generates a notification message upon the receipt of any update from a related server and displays the notification message on top of a graphic user interface of the user equipment. For example, an e-mail application may automatically generate a notification message for a new e-mail whenever user equipment 100 receives a new e-mail from other party and display the generated notification message on top of a graphic user interface such as a home screen of the user equipment. An SMS application may operate in the same way of the e-mail application. When the user equipment is coupled to an external device, user equipment may control such notification message not to be displayed on a display unit of the coupled external device in accordance with at least one embodiment of the present invention. Such operation will be described in detail with reference to FIG. 3 to FIG. 7. Before describing the operation, overall configuration and structure of user equipment and external device are described with reference to FIG. 1 and FIG. 2. User equipment may be coupled to various types of external devices. Such external devices will be described with reference to FIG. 1. For convenience and ease of understanding, user equipment will be described as a mobile terminal such as a mobile phone or a smart phone throughout the accompanying drawings. The present invention, however, is not limited thereto.

Figure 1:
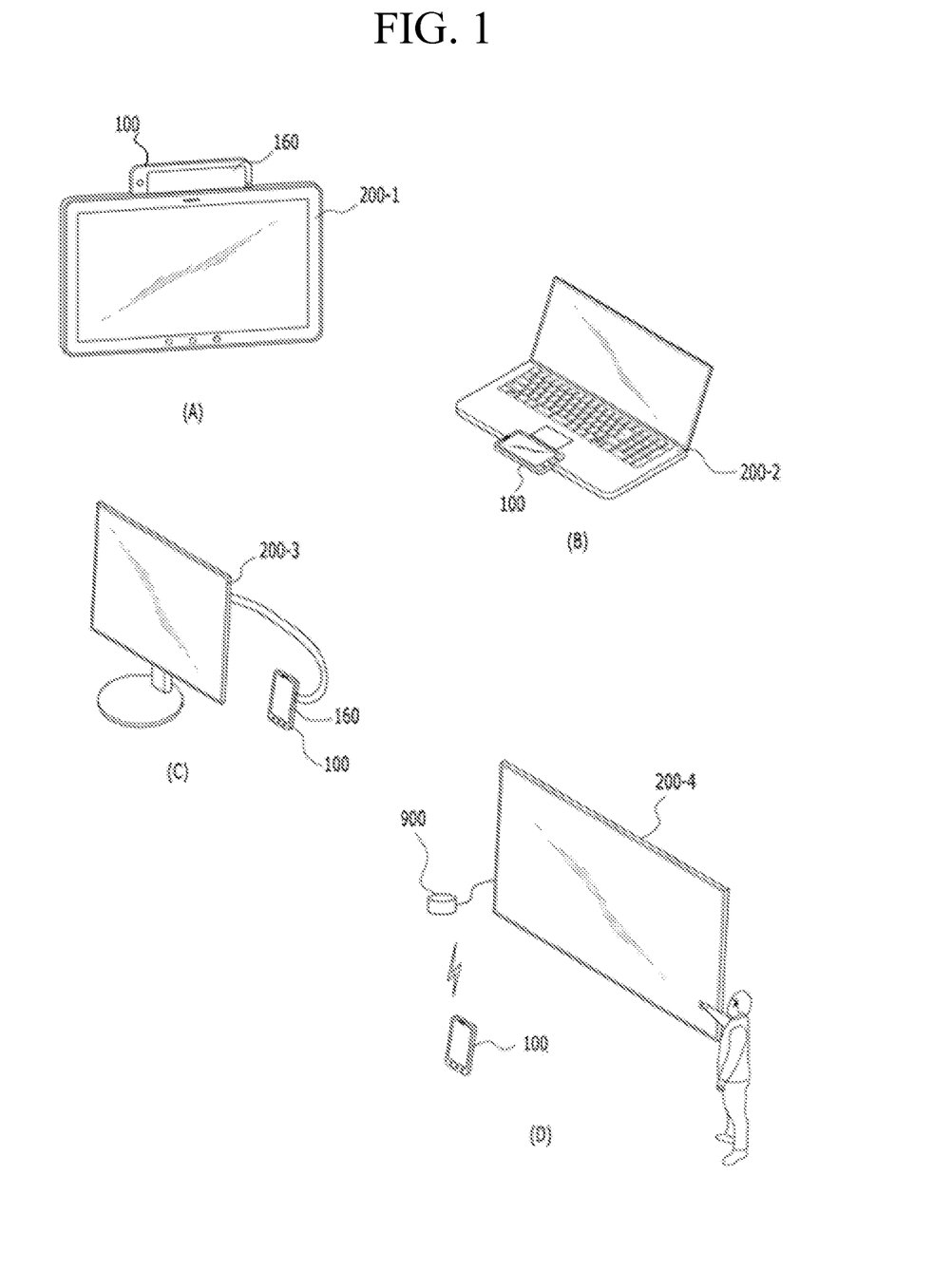
FIG. 1 shows various external devices connected to user equipment in accordance with at least one embodiment of the present invention.

FIG. 1 shows various external devices connected to user equipment in accordance with at least one embodiment of the present invention.

Referring to FIG. 1, user equipment 100 may be coupled to various types of external devices. For example, user equipment 100 may be coupled to pad type device 200-1 as shown in a diagram (A) and coupled to laptop type device 200-2 as shown in a diagram (B). Furthermore, user equipment 100 may be coupled to monitor 200-3 as shown in a diagram (C) and coupled to large sized screen 200-4 as shown in a diagram (D). Although not illustrated in FIG. 1, other types of devices may be coupled to user equipment 100 as an external device for displaying image data produced by user equipment 100.

User equipment 100 may be coupled to an external device in various manners. For such connection, user equipment 100 and the external device may include input/output ports. For example, user equipment 100 may be docked at a docking bay of an external device. As shown in the diagrams (A) and (B), pad type device 200-1 and laptop computer 200-2 may include a docking bay specially designed to receive user equipment 100. Furthermore, user equipment 100 may be coupled to an external device through a physical cable. As shown in the diagram (C), user equipment 100 may be coupled to monitor 200-3 through a physical cable such as a video and/or audio input/output cable. In addition, user equipment 100 may be coupled to an external device through a wireless manner such as WiFi, WiFi direct, and wireless high definition multimedia interface (HDMI). As shown in the diagram (D), user equipment 100 may be coupled to large sized screen 200-4 through signal receiving device 900 for receiving an image data signal from user equipment 100 through a wireless link.

As described, user equipment 100 may be directly coupled to the external device, but the present invention is not limited thereto. User equipment 100 may be indirectly coupled to the external device through a hub device. For example, user equipment 100 may be indirectly coupled to external display device 200-4 through laptop device 200-2 as a hub device. Furthermore, user equipment 100 may be indirectly coupled to external device 200-4 through pad type device 200-1 as a hub device. In this case, laptop device 200-2 and pad type device 200-1 may be a docking device specially designed for user equipment 100. Such laptop device 200-2 and pad type device 200-1 may be a dummy device having minimum processing power for enhancing performance of user equipment 100. Laptop device 200-2 and pad type device 200-1 may have features enhancing the performance of user equipment 100, such as a larger screen size, a butter speaker, a convenient input device such as a wider keyboard and touch pad, and various interfaces for an external device.

Such a hub device may receive image data produced in user equipment 100 and transfer the received image data to an external display device. In addition, the hub device may modify the image data received from user equipment 100 to be adjusted for the external device. After modification, the hub device may transfer the modified image data to the external device.

An external device may be any device having a display unit and a coupling interface matched with user equipment 100. Such an external device may be coupled to user equipment 100 and receive image data produced in user equipment 100 through the coupling interface. The external device may display the received image data in response to the control of user equipment 100. For example, the external device may include a notebook computer, a laptop computer, a tablet PC, a pad having a touch screen, and a pad having a display unit and a keyboard, but the present invention is not limited thereto. In accordance with at least one embodiment of the present invention, the external device may be activated when user equipment 100 is connected to the external device and controlled by user equipment 100. Accordingly, the external device may have at least constituent elements for necessary operation performed under the control of user equipment 100.

User equipment 100 may operate in a standalone mode when user equipment 100 is not coupled to an external device. After user equipment 100 is coupled to the external device, user equipment 100 may transmit and receive data to/from the external device through predetermined coupling interfaces. Particularly, user equipment 100 may operate as an image data source device and transfer image data produced in user equipment 100 to the coupled external device. The coupled external device may receive and display the image data from user equipment 100 in response to the control of user equipment 100. Typically, user equipment 100 transfers entire image data to the coupled external device. That is, the external device displays mirrored image data that is exactly same as image data displayed on user equipment. Due to such a typical way of transferring image data from the user equipment to the coupled external device, a user might be uncomfortable showing the entire image data produced in the user equipment. For example, while displaying a presentation material on a larger sized monitor coupled to the user equipment, the user equipment may generate a notification message due to the receipt of an event signal invoking an application associated with a push service. In this case, the generated notification message may be displayed on a top of the displayed presentation material. When such notification message has very private content, a corresponding user might be very embarrassed and audience thereof might be greatly distracted.

In order to overcome such disadvantage, user equipment controls at least one feature of an application not to generate a notification message or not to transfer the notification message to a coupled external device in accordance with at least one embodiment of the present invention. Hereinafter, essential elements of user equipment 100 will be described with reference to FIG. 2. For convenience and ease of understanding, user equipment will be representatively described as a mobile phone or a smart phone through the specification, but the present invention is not limited thereof.

Figure 2:
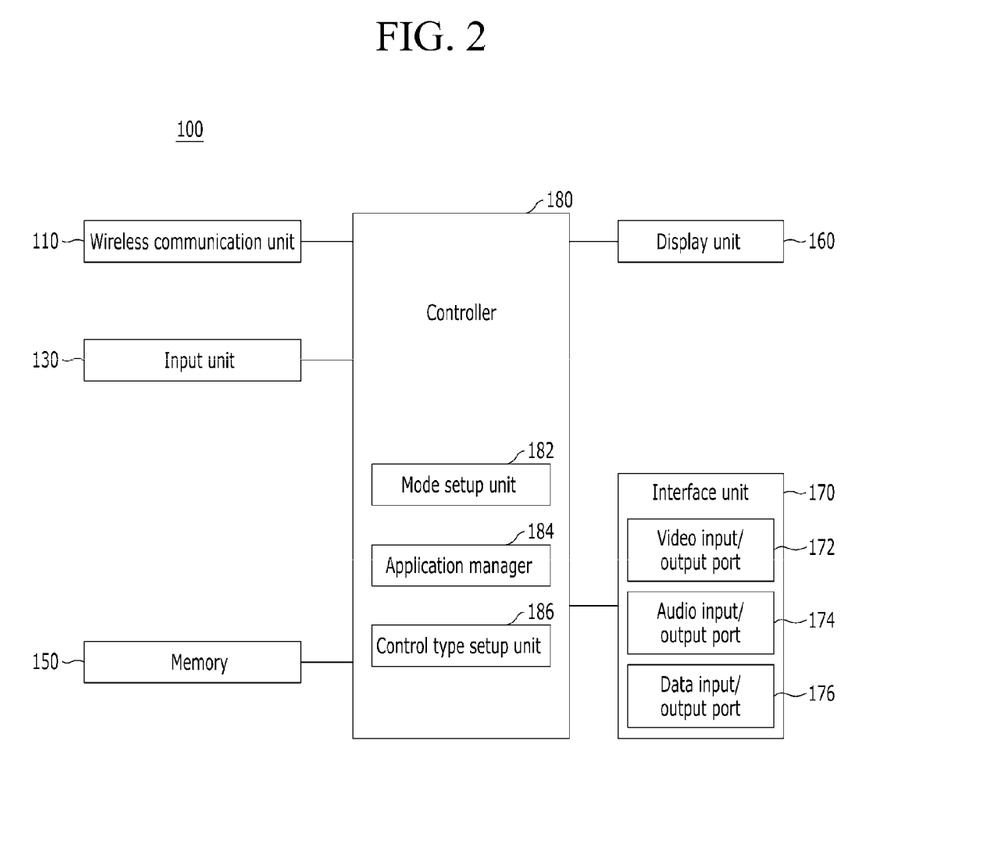
FIG. 2 is a block diagram illustrating user equipment in accordance with at least one embodiment of the present invention.

FIG. 2 is a block diagram illustrating user equipment in accordance with at least one embodiment of the present invention.

Referring to FIG. 2, user equipment 100 may include wireless communication unit 110, input unit 130, memory 150, display unit 160, interface unit 170, controller 180, mode setup unit 182, application manager 184, and control type setup unit 186. Interface unit 170 may include video input/output port 172, audio input/output port 174, and data input/output port 176. User equipment 100 may be described as including the above constituent elements, but the present invention is not limited thereto.

Wireless communication unit 110 may include at least one module for communicating with another party through a wireless communication system. For example, wireless communication unit 110 may include any or all of a broadcasting signal receiving module, a mobile communication module, a wireless Internet module, a short-distance communication module, and a location information module. In accordance with at least one embodiment of the present invention, wireless communication unit 110 may be not an essential unit for user equipment 100 because user equipment 100 may not necessarily be required to communicate with another party. Accordingly, wireless communication unit 110 may be omitted.

Input unit 130 may be a user interface for receiving input from a user. Such an input unit 130 may be realized in various types. For example, input unit 130 may include any of a keypad, a dome switch, a touch pad, a jog wheel, and a jog switch, but is not limited thereto.

In accordance with at least one embodiment of the present invention, user equipment 100 may be a full touch type smart phone. In this case, input unit 130 may include several hardware key buttons and a touch screen. The hardware key buttons may include a hold key and a volume control button. Input unit 130 may include a touch screen panel for receiving touch inputs in accordance with embodiments of the present invention. The touch screen panel may be disposed on an upper surface of display unit 160, but the present invention is not limited thereto.

Such input unit 130 may receive selection inputs from a user for selecting one of applications installed in user equipment 100 to set an operation control type of the selected application. The operation control type may be one of a restricted application and an allowed application. When the operation control type of the selected application is set as the restricted application, user equipment 100 (i.e., controller 180) may restrict transferring image data produced by the selected application to a coupled external device. Input unit 130 may receive selection inputs from a user for registering a coupled external device as one of a restricted external device and an allowed external device. The coupled external device is set as the restricted external device, user equipment 100 (i.e., controller 180) may restrict transferring image data produced by a predetermined application to the restricted external device in accordance with at least one embodiment of the present invention. Such operation will be described in detail with reference to FIG. 5 to FIG. 7.

Memory 150 may be used as a data storage device of user equipment 100. For example, memory 150 may store information necessary for operating user equipment 100 and performing certain operations requested by a user. Such information may include any software programs and related data. For example, memory 150 may store an operation system data, applications, and related data, received from an external device through a physical cable and downloaded from a related server through a communication link. In accordance with at least one embodiment of the present invention, memory 150 may store information on display setting determined for display unit 160 or a display unit of an external device. Furthermore, memory 150 may store device unit information for candidate external devices connectable to user equipment 100. In addition, memory 150 may store a DPI table (not shown). Memory 150 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

Display unit 160 may be an output device for visually displaying information. For example, display unit 160 may display image data produced or processed by controller 180. Display unit 160 may receive the image data from controller 180 and display the received image data. The image data may be produced as a result of certain operations performed by any software programs installed in user equipment 100. For example, the image data may be data processed for displaying a graphic user interface produced by an operation system and applications, performed in user equipment 100. The applications may be referred to as App. Also, the image data may further include still images and moving images, produced or processed by video processing unit 140 and controller 180. For example, display unit 160 may be a liquid crystal display (LCD) panel or an active-matrix organic light-emitting diode (AMOLED) panel, but the present invention is not limited thereto.

In accordance with at least one embodiment of the present invention, display unit 160 may be interrupted so as to display the image data when user equipment 100 is connected to an external device. For example, display unit 160 may be turned off or transitioned to a sleep mode in response to controller 180 when user equipment 100 is connected to an external device. Display unit 160 may be turned on again or transition back to an operation mode in response to controller 180 when user equipment 100 is disconnected from an external device. That is, display unit 160 may be turned off in the pointing device operation mode in accordance with embodiments of the present invention. After turning off display unit 160, controller 180 may transmit image data to a coupled external device for displaying on the image data on a display unit of external device 200.

Display unit 160 may display a user interface for selecting at least one of applications installed in user equipment 100. Based on the provided user interface through display unit 160, a user may be enabled to select an application to be set as one of a restricted application and an allowed application. Display unit 160 may display a user interface for registering a coupled external device as one of a restricted external device and an allowed external device in accordance with at least one embodiment of the present invention.

Interface unit 170 may include at least one port for exchanging signals and/or data with a coupled external device. In accordance with at least one embodiment of the present invention, interface unit 170 may transfer image data and audio data from user equipment 100 to a coupled external device. Interface unit 170 may exchange control data with a coupled external device. Interface unit 170 may be coupled to a corresponding interface unit of an external device in various coupling manners. For example, interface unit 170 may be coupled to a corresponding interface unit of an external device through a physical cable. Furthermore, interface unit 170 may be directly interlocked with a corresponding interface unit of an external device. The present invention, however, is not limited thereto. Interface unit 170 may be coupled to a corresponding interface unit of an external device through a radio link formed between user equipment 100 and the external device. In this case, interface unit 170 and a corresponding interface unit of the external device may include a signal transmitter and receiver (not shown) for communicating with each other using a communication protocol. Such communication protocol may be Bluetooth, but the present invention is not limited thereto.

As shown in FIG. 4, interface unit 170 may include video input/output port 172, audio input/output port 174, and data input/output port 176, but the present invention is not limited thereto. Such interface unit 170 may be embodied in various types. For example, interface unit 170 may not include audio input/output interface 174. Further, interface unit 170 may include a power port (not shown). In this case, the power port may transfer power from an external device to user equipment 100 when the external device is coupled to user equipment 100.

In accordance with an embodiment of the present invention, user equipment 100 may be coupled to an external device through interface unit 170. After user equipment 100 is coupled to the external device, user equipment 100 may control the coupled external device by exchanging data with the coupled external device through interface unit 170. For example, user equipment 100 may receive inputs from a user through the coupled external device and transmit control data to the coupled external device through interface unit 170. Particularly, user equipment 100 may transmit image data through interface unit 170 to the coupled external device and control the coupled external device to display the image data such a graphic user interface instead of display unit 160 of user equipment 100.

Interface unit 170 may detect connection to an external device and generate an event signal to controller 180. For example, interface unit 170 may include a hot plug detect (HPD) pin when interface unit 170 includes a HDMI port. The HPD pin may generate a detection signal. Upon the detection signal, mode setup unit 135 may determine that an external device is connected to user equipment 100 and set an operation mode (i.e., a connection state) as one of a standalone mode and a connected mode based on the determination result.

Controller 180 may control overall operation of the constituent elements of user equipment 100. Particularly, controller 180 may perform operations necessary for driving the constituent elements of user equipment 100 in response to inputs received from a related user. Controller 180 may control overall operation of constituent elements of an external device when user equipment 100 is connected to the external device. For example, controller 180 may receive inputs through the coupled external device, perform an operation in response to the received inputs, and provide the user with the result thereof through the coupled external device. Particularly, controller 180 may display image data, as a result of operation related to the user inputs, on a display unit of the coupled external device.

Application manager 184 may detect the activation of applications installed in user equipment 10. Particularly, application manager 182 may determine whether any event is generated for activating an application associated with a push service or whether a notification message is generated by an application in accordance with at least one embodiment of the present invention.

Mode setup unit 182 may set an operation mode (i.e., a connection state) of user equipment upon the detection of connection to an external device. Such detection may be determined based on a connection detected signal from interface unit 170. For example, mode setup unit 135 may receive a connection detected signal or a connection released signal from a hot plug detect (HPD) pin when interface unit 170 includes a HDMI port. Based on the detection signals, mode setup unit 135 may change an operation mode of user equipment 100. For example, when such connection detected signal is received from interface unit 170 such as the HPD pin, mode setup unit 182 may determine that user equipment 100 is coupled to an external device and set an operation mode of user equipment 100 as a connected mode. Furthermore, when a connection release signal is received from interface unit 170, mode setup unit 182 may determine that user equipment 100 is released from the coupled external device and set an operation mode of user equipment 100 as a standalone mode.

Control type setup unit 186 may set an operation control type of an application. For example, control type setup unit 186 may select applications based on a selection user input from a user, set an operation control type of the selected application as one of a restricted application and an allowed application based on the received selection user input. Control type setup unit 186 may select applications that automatically generate a message in response to a predetermined event signal and set the selected applications as a restricted application. In this case, the selected application may be an application associated with a push service and such application may automatically generate a notification message whenever a new content is received from a related server.

In accordance with at least one embodiment of the present invention, controller 180 may determine whether image data produced by the activated application is transferred to a coupled external device when the mode setup unit detects the operation mode of the user equipment as a connected mode. For example, controller may restrict the produced image data of the activated application from being transferred to the coupled external device when an application control type of the activated application is a restricted application, otherwise, transfer the produced image data of the activated application to the coupled external device. Such operation will be described in detail with reference to FIG. 5 and FIG. 7.

As described above, user equipment may restrict image data produced by a predetermined application from being transferred to a coupled external device in accordance with at least one embodiment of the present invention. Particularly, user equipment may restrict at least one feature of predetermined applications from being executed and/or image data produced by the predetermined applications from being transferred to a coupled external device while the user equipment is coupled to the external device. The restricted image data may be a notification message produced by a predetermined application. The predetermined application may be an application associated with a push service, which automatically generates a notification message in response to a predetermined event signal. Hereinafter, a method for controlling at least one feature of applications according to a connection state of user equipment will be described with reference to FIG. 3 to FIG. 7.

Figure 3:
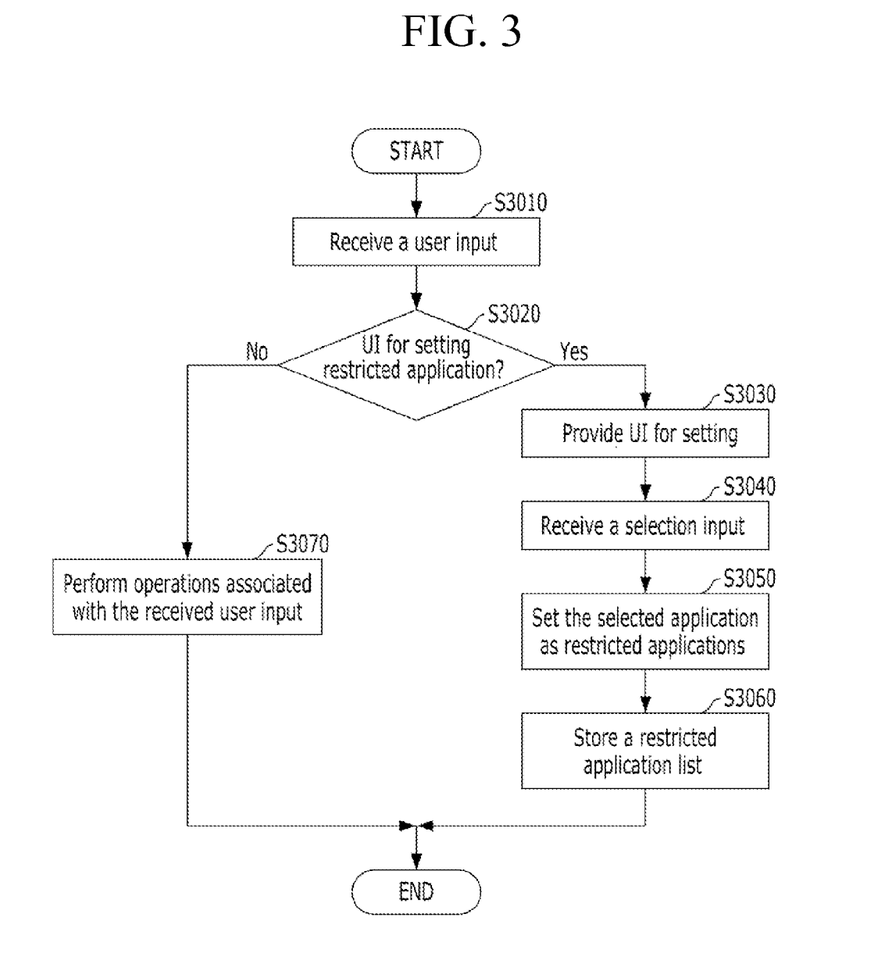
FIG. 3 shows a method for selecting an application to be controlled in accordance with at least one embodiment of the present invention.

FIG. 3 shows a method for selecting an application to be controlled in accordance with at least one embodiment of the present invention.

Referring to FIG. 3, user equipment 100 may receive a user input at step S3010 and determine whether the received user input is an initiation input for initiating a user interface for selecting applications to be controlled at step S3020. The application to be controlled may be an application to be restricted from being executed or from generating a notification message in accordance with at least one embodiment of the present invention. Such application may be an application associated with a push service. The push service may be a service provided based on a publish/subscribe model. Whenever new content related to the application (i.e., subscriber), a server (i.e., publisher) may push new contents out to the application. Such application may generate a notification message whenever new content is received from a server. In accordance with at least one embodiment of the present invention, such applications generating a notification message in association with a push service may be a target application to be controlled.

When the user input is not the initiation input (No-S3020), user equipment 100 may perform an operation associated with the received user input at step S3070. When the user input is the initiation input (Yes-S3020), user equipment 100 may provide a user interface (UI) for selecting applications to be controlled at step S3030. The user interface may be a graphic user interface including a list of applications installed in user equipment 100, a name of each application, a short description of each application, and a predetermined icon or thumbnail image of each application, but the present invention is not limited thereto. Furthermore, the user interface may receive a user input to receive a selection input.

At step S3040, user equipment 100 may receive selection inputs for selecting at least one application from the user. For example, a user may select at least one of the provided applications to be controlled. At step S3050 and S3060, user equipment 100 may set an application control type of the selected applications as restricted applications and store a list of the selected applications as a restricted application list in memory 150.

In accordance with at least one embodiment of the present invention, user equipment 100 may use the stored restricted application list to control at least one of the execution of at least one feature of each application and the transfer of operation results (i.e., image data) of each application to a coupled external device when user equipment 100 is coupled to an external device. Such operation will be described with reference to FIG. 5 and FIG. 7.

In accordance with at least one embodiment of the present invention, user equipment 100 may enable a user to register an external device as an allowed external device for displaying image data produced by a predetermined application running in user equipment 100 or to register an external device as a restricted external device for restricting displaying image data produced by a predetermined application running in user equipment. Particularly, the allowed external device may display mirrored image about the same as that displayed on user equipment 100. The restricted external device may not display image data produced by predetermined applications running in user equipment 100. The image data produced by the predetermined applications may be a notification message and the predetermined application may be an application associated with a push service, but the present invention is not limited thereto. Such operation will be described in detail with reference to FIG. 4.

Figure 4:
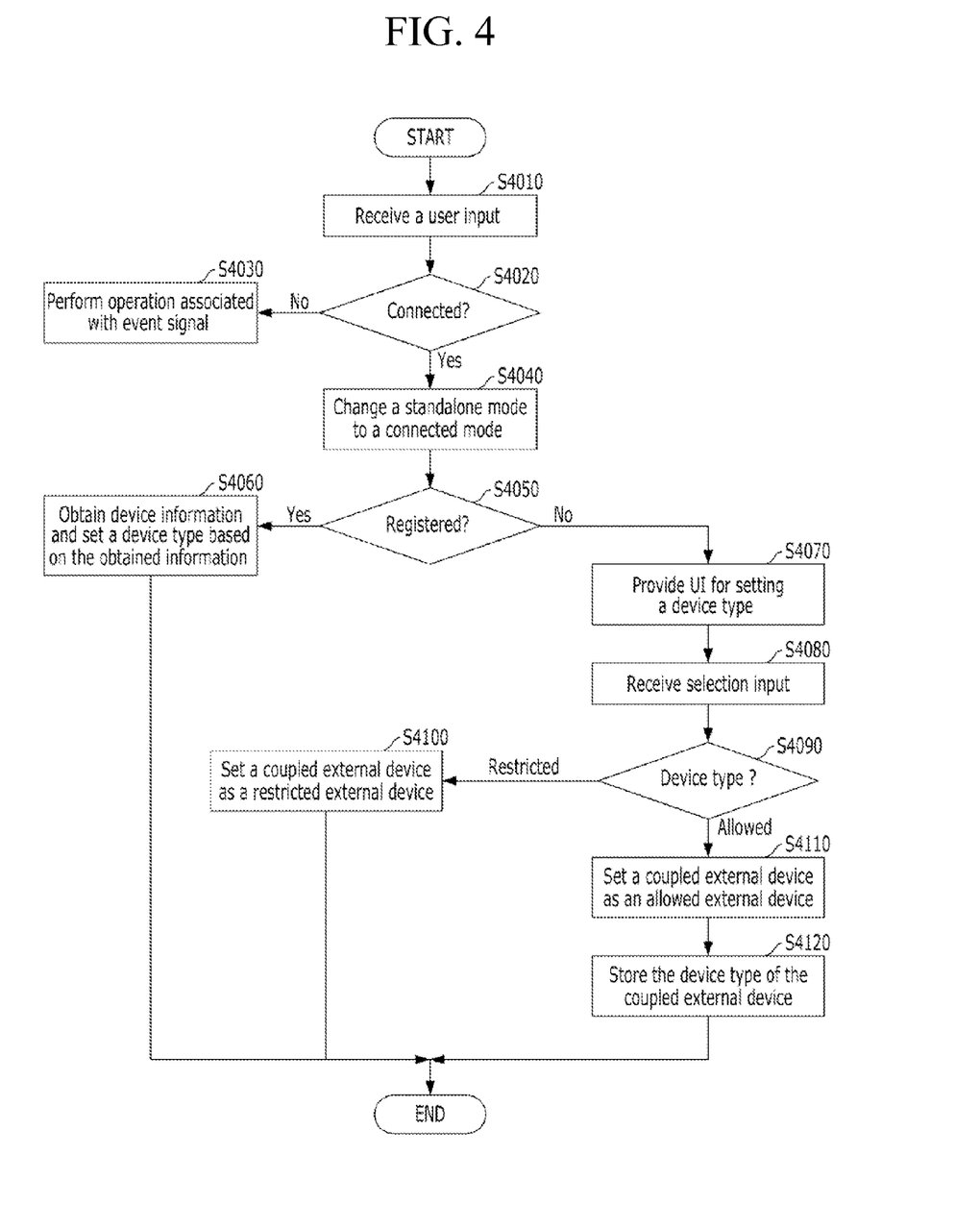
FIG. 4 shows a method for registering an external device as an allowed external device or a restricted external device in accordance with at least one embodiment of the present invention.

FIG. 4 shows a method for registering an external device as an allowed external device or a restricted external device in accordance with at least one embodiment of the present invention.

Referring to FIG. 4, user equipment 100 may operate in a standalone mode at step S4010. When an event signal is received, user equipment 100 may determine whether the received event signal is a connection detected signal at step S4020. Such event signal may be generated by interface unit 170 of user equipment 100 when user equipment 100 is coupled to an external device, but the present invention is not limited thereto. When user equipment 100 is coupled to an external device through a radio link, such event signal may be a message received from the coupled external device.

When the event signal is not determined as the connection detected signal (No-S4020), user equipment 100 may perform operations associated with the received event signal at step S4030. When the event signal is determined as the connection detected signal (Yes-S4020), user equipment 100 may change an operation mode of user equipment 100 from the standalone mode to a connected mode at step S4040.

At step S4050, user equipment 100 may determine whether the coupled external device is previously registered as one of an allowed external device and a restricted external device at step S4050. When the coupled device is previously registered (Yes-S4050), user equipment 100 may obtain device information of the coupled external device and set a device type as one of an allowed external device and a restricted external device based on the obtained device information at step S4060.

When the coupled external device is not previously registered (No-S4050), user equipment 100 may provide a user interface (UI) for registering the coupled external device as one of an allowed external device and a restricted external device at step S4070. For example, user equipment 100 may display a message to inquire a user to register on display unit 160. The user may input a selection input to set a device type of the coupled external device as one of the allowed external device and the restricted external device in response to the displayed message.

At step S4080, user equipment 100 may receive a selection input from a user to set a device type as one of the allowed external device and the restricted external device. At step S4090, user equipment 100 may determine whether the selection input is for registering the coupled external device as one of an allowed external device and a restricted external device.

When the received selection input is for the allowed external device (allowed-S4090), user equipment 100 may set a device type of the coupled external device as the allowed external device at step S4100. When the received selection input is for the restricted external device (restricted-S4100), user equipment 100 may set a device type of the coupled external device as the restricted external device at step S4110.

After setting the device type of the coupled external device, user equipment 100 may store the set device type of the coupled external device in memory 150 at step S4120. Furthermore, such device type may be stored in at least one of user equipment 100 and the coupled external device as a part of device information.

As described above, user equipment 100 may restrict at least one of the execution of at least one feature of predetermined applications and the transfer of image data produced by at least one feature of the predetermined application based on the restricted application list, the connection state (i.e., the operation mode) and the device type of a coupled external device. Hereinafter, a method for restricting transferring of image data produced by a predetermined application according to a connection state of user equipment in accordance with at least one embodiment of the present invention will be described with reference to FIG. 5 and FIG. 7.

Figure 5:
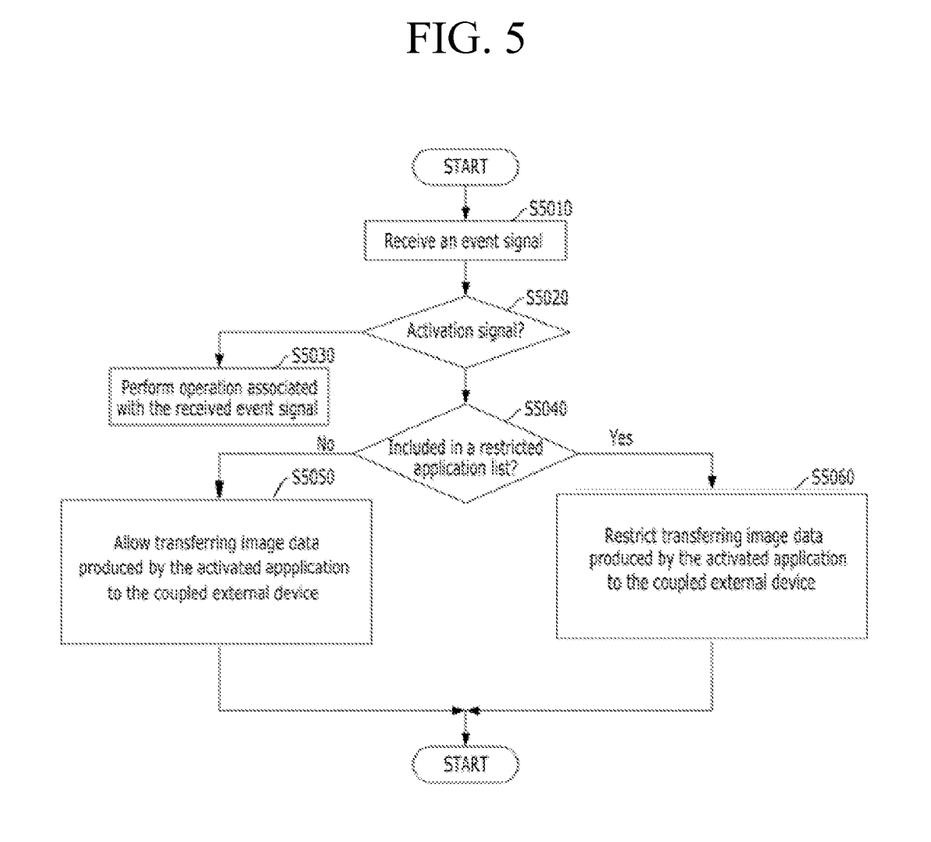
FIG. 5 shows a method for restricting transferring of image data produced by a predetermined application based on a restricted application list in accordance with at least one embodiment of the present invention.

FIG. 5 shows a method for restricting transferring of image data produced by a predetermined application based on a restricted application list in accordance with at least one embodiment of the present invention.

Referring to FIG. 5, user equipment 100 may receive an event signal at step S5010 and determine whether the received event signal is an activation event for activating an application at step S5020. When the received event signal is not the activation event for activating an application (No-S5020), user equipment 100 may perform operations associated with the received event signal at step S5030. When the received event signal is the activation event for activating an application (Yes-S5020), user equipment 100 may determine whether the activated application is included in a restricted application list at step S5040.

When the activated application is not in the restricted application list (Yes-S5040), user equipment 100 may allow the execution of the activated application, the generation of image data (i.e., a notification message) of the activated application, and the transfer of the image data (including the notification message) of the activated application to the coupled external device at step S5050. For example, the coupled external device may display mirrored image data that is about the same as what user equipment 100 displays. That is, although a notification message is generated by an application associated with a push service, the coupled external device may display the generated notification message.

When the activated application is in the restricted application list (No-S5040), user equipment 100 may restrict the execution of at least one feature of the activated application, the generation of image data (i.e., a notification message) of the activated application, and the transfer of the generated image data (i.e., a notification message) of the activated application to the coupled external device at step S5060. For example, when the activated application is included in the restricted application list, user equipment 100 may restrict the activated application from generating image data such as a notification message. Furthermore, although the activated application generates the image data (i.e., a notification message), user equipment 100 may not transfer the generated image data to the coupled external device. In this case, user equipment 100 may display the generated image data such as a notification message but the coupled external device does not display the generated image data. In addition, user equipment 100 may restrict the execution of the activated application.

As described above, user equipment 100 may restrict transferring image data produced by at least one application based on the restricted application list. Although a device type of the coupled external device is an allowed external device, user equipment 100 may restrict the execution of an application when the application is included in the restricted application list. The present invention, however, is not limited thereto. User equipment 100 may refer to a device type of a coupled external device to control at least one application installed in user equipment 100 in accordance with another embodiment of the present invention. Such operation will be described with reference to FIG. 6.

Figure 6:
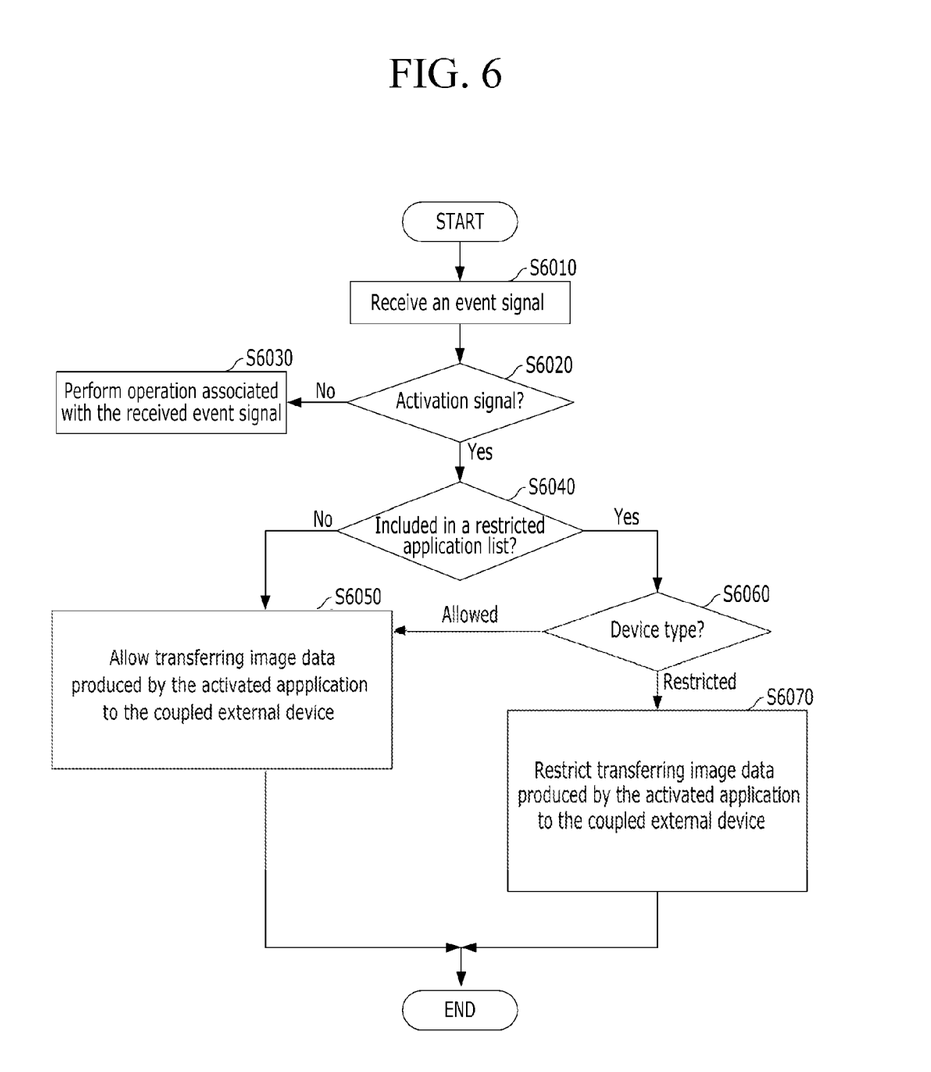
FIG. 6 shows a method for restricting transferring of image data produced by a predetermined application based on a restricted application list and a device type of a coupled external device in accordance with at least one embodiment of the present invention.

FIG. 6 shows a method for restricting transferring of image data produced by a predetermined application based on a restricted application list and a device type of a coupled external device in accordance with at least one embodiment of the present invention.

Referring to FIG. 6, user equipment 100 may receive an event signal at step S6010 and determine whether the received event signal is an activation event for activating an application at step S6020. When the received event signal is not the activation event for activating an application (No-S6020), user equipment 100 may perform operations associated with the received event signal at step S6030. When the received event signal is the activation event for activating an application (Yes-S6020), user equipment 100 may determine whether the activated application is included in a restricted application list at step S6040.

When the activated application is not in the restricted application list (Yes-S6040), user equipment 100 may allow the execution of the activated application and the transfer of the operation results (including the notification message) of the activated application to the coupled external device at step S6050. For example, the coupled external device may display mirrored image data that is about the same as what user equipment 100 displays. That is, although a notification message is generated by an application associated with a push service, the coupled external device may display the generated notification message.

When the activated application is in the restricted application list (No-S6040), user equipment 100 may determine whether the coupled external device is registered as an allowed external device or a restricted external device at step S6060.

When the coupled external device is registered as the allowed external device (Allowed-S5060), user equipment 100 may allow the execution of the activated application and the transfer of the image data produced by the activated application to the coupled external device at step S6050.

When the coupled external device is registered as the restricted external device (Restricted-S6060), user equipment 100 may restrict the execution of at least one feature of the activated application, the generation of image data (i.e., a notification message) of the activated application, and the transfer of the generated image data (i.e., a notification message) of the activated application to the coupled external device at step S6070. For example, when the activated application is included in the restricted application list and when the device type of the coupled external device is the restricted external device, user equipment 100 may restrict the activated application from generating image data such as a notification message. Furthermore, although the activated application generates the image data (i.e., a notification message), user equipment 100 may not transfer the generated image data to the coupled external device. In this case, user equipment 100 may display the generated image data such as a notification message but the coupled external device does not display the generated image data. In addition, user equipment 100 may restrict the execution of the activated application.

As described above, user equipment 100 may allow the execution of the activated application when the device type of the coupled external device is the allowed external device although the activated application is included in the restricted application list in accordance with at least one embodiment of the present invention. The present invention, however, is not limited thereto. User equipment 100 may control the execution of at least one application based on an operation condition of a respective service feature of user equipment 100 in accordance with another embodiment of the present invention. For example, a user may activate or inactivate a certain service feature of user equipment. Particularly, a user may activate or inactivate a notification service feature of user equipment. Such operation condition of the notification service feature may be referred to control a related application in accordance with at least one embodiment of the present invention. Such operation will be described with reference to FIG. 7.

Figure 7:
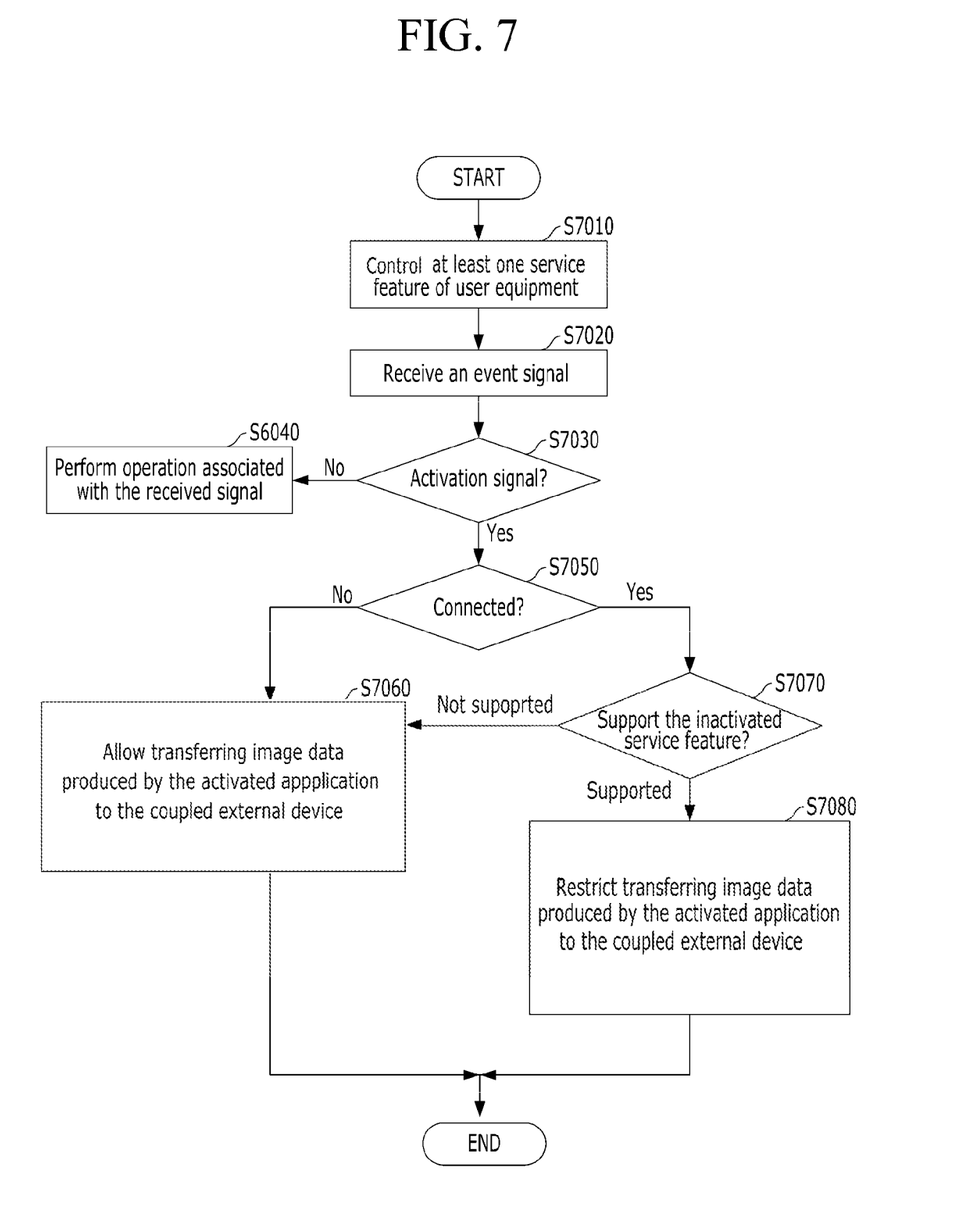
FIG. 7 shows a method for controlling at least one feature of an application based on an operation condition of user equipment and a connection mode of user equipment in accordance with at least one embodiment of the present invention.

FIG. 7 shows a method for controlling at least one feature of an application based on an operation condition of user equipment and a connection mode of user equipment in accordance with at least one embodiment of the present invention.

Referring to FIG. 7, user equipment 100 may control at least one service feature of user equipment 100 in response to a user input at step S7010. For example, user equipment 100 may activate or inactivate a notification service feature of user equipment 100 in association with a push service in response to a user. When the notification service feature is activated, all applications associated with a push service may generate a notification message whenever a related event signal is received. If user equipment 100 is coupled to an external device with the notification service feature activated, such a generated notification message may be displayed on a display unit of the coupled external device. When the notification service feature is inactivated, all applications associated with a push service may be restricted from generating a notification message whenever a related event signal is received.

At step S7020, user equipment 100 may receive an event signal. Upon the receipt of the event signal, user equipment 100 may determine whether the received event signal is an activation input for activating one of applications installed in user equipment 100 at step S7030.

When the received event signal is not the activation input (No-S7030), user equipment 100 may perform operations associated with the received event signal at step S7040. When the received event signal is the activation input (Yes-S7030), user equipment 100 may determine whether an operation mode of user equipment 100 is a standalone mode or a connected mode at step S7050.

When the operation mode is the standalone mode (Standalone-S7050), user equipment 100 may execute the activated application at step S7060. When the operation mode is the connected mode (Connected mode-S7050), user equipment 100 may determine whether the activated application supports the inactivated service feature of user equipment 100 at step S7070.

When the activated application does not support the inactivated service feature of user equipment 100 (Not supported-S7070), user equipment 100 may user equipment 100 may execute the activated application and transfer the operation result (i.e., image data) to the coupled external device at step S7060. When the activated application supports the inactivated service feature of user equipment 100 (Supported-S7070), user equipment 100 may restrict the execution of at least one feature of the activated application, the generation of image data (i.e., a notification message) of the activated application, and the transfer of the generated image data (i.e., a notification message) of the activated application to the coupled external device at step S7080. For example, when the activated application is included in the restricted application list, user equipment 100 may restrict the activated application from generating image data such as a notification message. Furthermore, although the activated application generates the image data (i.e., a notification message), user equipment 100 may not transfer the generated image data to the coupled external device. In this case, user equipment 100 may display the generated image data such as a notification message but the coupled external device does not display the generated image data. In addition, user equipment 100 may restrict the execution of the activated application.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a controlling unit, a controlling unit, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose controlling unit, the program code segments combine with the controlling unit to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for restricting transferring of image data produced by a predetermined application to a coupled external device, the user equipment, the method comprising:
setting an application control type of at least one application selected by a user from applications included in the user equipment, as a restricted application;
storing a list of the selected at least one application as a restricted application list;
detecting an activation of an application in the user equipment while the user equipment is coupled to an external device;
determining whether a corresponding application control type of the activated application is the restricted application;
automatically restricting image data produced by the activated application from being transferred to the coupled external device when the application control type is determined to be the restricted application; and
transferring the produced image data of the activated application to the coupled external device when the application control type is not determined to be the restricted application, wherein the determining includes:
determining the application control type of the activated application as the restricted application at least one of (i) when the activated application is included in the restricted application list and (ii) when the activated application is associated with a push service; and
wherein the restricting includes:
when push data is received through the push service from a related server, restricting the image data produced based on the received push data, from being transferred to the coupled external device.

2. The method of claim 1, wherein the setting comprising:
providing a user interface for selecting at least one of applications installed in the user equipment to a user;
receiving selection inputs from the user through the provided user interface;
selecting the at least one applications based on the received selection inputs from the user;
setting the application control type of the selected at least one application as the restricted application;
otherwise, setting the operation control type of unselected applications as an allowed application.

3. The method of claim 1, further comprising:
determining the application control type of the activated application as the restricted application when the activated application is an application automatically generating a message in response to a predetermined event signal.

4. The method of claim 1, further comprising:
determining whether a device type of the coupled external device is a restricted external device;
restricting the produced image data of the activated application from being transferred to the coupled external device when the device type of the coupled external device is the restricted external device;
otherwise, transferring the produced image data of the activated application to the coupled external device.

5. The method of claim 4, further comprising:
providing a user interface for registering the coupled external device as the restricted external device and an allowed external device, to the user;
receiving selection inputs from the user; and
setting the device type of the coupled external device as one of the restricted external device and the allowed external device based on the selection inputs from the user.

6. The method of restricting transferring of image data produced by a predetermined application to a coupled external device, in user equipment, the method comprising:
inactivating at least one service feature selected by a user from service features of the user equipment, wherein the selected at least one service feature includes a notification service feature of the user equipment;
detecting an activation of an application in the user equipment while the user equipment is coupled to an external device;
determining whether the activated application supports the at least one inactivated service feature of the user equipment when an application activation is detected;
automatically restricting image data produced by the activated application from being transferred to the coupled external device when the activated application is determined to support the at least one inactivated service feature of the user equipment; and transferring the produced image data of the activated application to the coupled external device when the activated application is not determined to support the at least one inactivated service feature of the user equipment,
wherein the restricting includes:
when push data is received through a push service from a related server, restricting a notification message, produced by the push data, generated by a corresponding activated application supporting an inactivated notification service feature, from being transferred to the coupled external device.

7. A user equipment for restricting transferring of image data produced by a predetermined application to a coupled external device, the user equipment comprising:
a control type setup unit configured (i) to set an application control type of at least one application selected by a user from applications included in the user equipment, as a restricted application, and (ii) to set the application control type of an activated application as the restricted application when the activated application is associated with a push service;
an application manager configured to detect an activation of an application;
a mode setup unit configured to detect an operation mode of the user equipment; and a controller configured to:
store a list of the selected at least one application as a restricted application list;
determine whether a corresponding application control type of the activated application is the restricted application, based on an application control type setting result of the control type setup unit, when the mode setup unit detects the operation mode of the user equipment as a connected mode and the application manager detects an application activation;
automatically restrict image data produced by the activated application from being transferred to the coupled external device when the application control type of the activatedapplication is determined to be the restricted application; and
transfer the produced image data of the activated application to the coupled external device when the application control type of the activated application is not determined to be the restricted application,
wherein the controller is configured to:
when push data is received through the push service from a related server, restrict the image data produced based on the received push data, from being transferred to the coupled external device.

8. The user equipment of claim 7, further comprising:
a display unit configured to display a user interface for selecting at least one of applications installed in the user equipment to the user; and an input unit configured to receive selection inputs from the user,
wherein the control type setup unit is configured to select at least one application based on the received selection inputs from the user, to set the application control type of the selected at least one application as the restricted application, otherwise, to set the application control type of unselected applications as an allowed application.

9. The user equipment of claim 7, wherein the control type setup unit is configured to further perform:
setting the application control type of the activated application as the restricted application when the activated application is an application automatically generating a message in response to a predetermined event signal.

10. The user equipment of claim 7, wherein the controller is configured to further perform:
determining when a device type of the coupled external device is a restricted external device,
restricting the produced image data of the activated application from being transferred to the coupled external device when the device type of the coupled external device is the restricted external device, otherwise, transferring the produced image data of the activated application to the coupled external device.

11. The user equipment of claim 10, further comprising:
a display unit is configured to provide a user interface for registering a coupled external device as the restricted external device and an allowed external device, to the user; and an input unit configured to receive selection inputs from the user,
wherein the control type setup unit is configured to further perform:
setting the device type of the coupled external device as one of the restricted external device and the allowed external device based on the received selection inputs.

12. A user equipment for restricting transferring of image data produced by a predetermined application to a coupled external device, the user equipment comprising:
an application manager configured to detect an activation of an application;
a mode setup unit configured to detect an operation mode of the user equipment; and
a controller configured to:
inactivate at least one service feature selected by a user from service features of the user equipment, wherein the selected at least one service feature includes a notification service feature of the user equipment;
determine whether the activated application supports the at least one inactivated service feature of the user equipment, when the mode setup unit detects the operation mode of the user equipment as a connected mode and the application manager detects an application activation;
automatically restrict image data produced by the activated application from being transferred to the coupled external device when the activated application is determined to support the at least one inactivated service feature of the user equipment; and
transfer the produced image data of the activated application to the coupled external device when the activated application is not determined to support the at least one inactivated service feature of the user equipment,
wherein the controller is configured to:
when push data is received through a push service from a related server, restrict a notification message, produced by the push data, generated by a corresponding activated application supporting an inactivated notification service feature, from being transferred to the coupled external device.

* * * * *

UNITED STATES PATENT AND TRADEMARK OFFICE
CERTIFICATE OF CORRECTION

PATENT NO. : 9,514,306 B2
APPLICATION NO. : 13/726830
DATED : December 6, 2016
INVENTOR(S) : Jung-Wook Lee et al.

Page 1 of 1

It is certified that error appears in the above-identified patent and that said Letters Patent is hereby corrected as shown below:

In the Claims

In Claim 1, Column 17, Line 24, "A method for" should be amended --A method of--.

In Claim 1, Column 17, Line 26, "the user equipment," should be amended --in user equipment,--.

In Claim 2, Column 17, Line 59, "applications" should be amended --the applications--.

In Claim 2, Column 17, Line 59, "to a user;" should be amended --to the user;--.

In Claim 2, Column 17, Line 62, "applications" should be amended --application--.

In Claim 2, Column 17, Line 66, "operation" should be amended --application--.

In Claim 6, Column 18, Line 25, "The method of" should be amended --A method of--.

In Claim 7, Column 19, Line 14, "activatedapplication" should be amended --activated application--.

In Claim 8, Column 19, Line 27, "at least one of applications" should be amended --at least one of the applications--.

In Claim 11, Column 20, Line 4, "unit is configured" should be amended --unit configured--.

Signed and Sealed this
Twenty-eighth Day of March, 2017

Michelle K. Lee
*Director of the United States Patent and Trademark Office*